(12) United States Patent
Cha et al.

(10) Patent No.: US 11,355,286 B2
(45) Date of Patent: Jun. 7, 2022

(54) METHOD OF MANUFACTURING CAPACITOR COMPONENT

(71) Applicant: SAMSUNG ELECTRO-MECHANICS CO., LTD., Suwon-si (KR)

(72) Inventors: Kyoung Jin Cha, Suwon-si (KR); Ji Hong Jo, Suwon-si (KR); Hyung Soon Kwon, Suwon-si (KR); Jong Hoon Kim, Suwon-si (KR); Jin Woo Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/298,340

(22) Filed: Mar. 11, 2019

(65) Prior Publication Data

US 2020/0161052 A1 May 21, 2020

(30) Foreign Application Priority Data

Nov. 19, 2018 (KR) ........................ 10-2018-0142585

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/224* (2013.01); *H01G 4/232* (2013.01);
(Continued)

(58) Field of Classification Search
CPC .......... H01G 4/33; H01G 4/224; H01G 4/248; H01G 4/262; H01G 4/012; H01G 4/30
See application file for complete search history.

(56) References Cited

U.S. PATENT DOCUMENTS 5,370,760 A * 12/1994 Mori ........................ H01G 4/30
156/89.16
7,326,309 B2 * 2/2008 Sato ........................ B32B 18/00
156/89.11
(Continued)

FOREIGN PATENT DOCUMENTS

JP H09-190948 A 7/1997
JP 2018113300 A * 7/2018 ............. H01G 4/005
(Continued)

OTHER PUBLICATIONS

Korean Office Action dated Jan. 6, 2020 issued in Korean Patent Application No. 10-2018-0142585 (with English translation).

*Primary Examiner* — Jeffrey T Carley
(74) *Attorney, Agent, or Firm* — Morgan, Lewis & Bockius LLP (57) ABSTRACT

A method of manufacturing a capacitor component includes preparing a laminate structure in which a plurality of ceramic sheets, each having an internal electrode pattern formed thereon, are layered, attaching an auxiliary member to an upper surface and a lower surface of the laminate structure, and disposing the laminate structure having the auxiliary member attached thereto on a lower mold on which jigs for blocking a length direction portion and a width direction portion of the laminate structure are disposed and compressing the laminate structure. The ceramic sheet has a thickness of 0.6 μm or less, and the auxiliary member has higher elasticity than elasticity of the lower mold.

17 Claims, 4 Drawing Sheets

(51) Int. Cl.
*H01G 4/248* (2006.01)
*H01G 4/232* (2006.01)
*H01G 4/224* (2006.01)
H01G 4/12 (2006.01)
H01G 4/33 (2006.01)

(52) U.S. Cl.
CPC ........... H01G 4/248 (2013.01); *H01G 4/1227* (2013.01); *H01G 4/33* (2013.01)

(56) References Cited

U.S. PATENT DOCUMENTS

| | | | | |
|---|---|---|---|---|
| 8,444,791 | B2* | 5/2013 | Ichiyanagi | ............... H01L 28/40 156/89.12 |
| 8,846,169 | B2* | 9/2014 | McCormick | ............... C09J 7/29 428/34.1 |
| 10,431,386 | B2* | 10/2019 | Kim | ....................... H01G 4/258 |
| 2001/0021097 | A1* | 9/2001 | Ohya | ..................... H01G 11/82 361/502 |
| 2006/0282999 | A1* | 12/2006 | Majumdar | ............. H05K 1/162 29/25.42 |
| 2011/0149470 | A1* | 6/2011 | Hur | ......................... H01G 4/12 29/25.42 |
| 2014/0022690 | A1* | 1/2014 | Kim | ........................ H01G 4/30 361/301.4 |
| 2014/0160617 | A1* | 6/2014 | Kim | ........................ H01G 4/30 361/301.4 |
| 2016/0049244 | A1* | 2/2016 | Kitano | ................ H01G 4/1209 361/301.4 |

FOREIGN PATENT DOCUMENTS

| | | |
|---|---|---|
| KR | 10-2010-0071201 A | 6/2010 |
| KR | 10-1524986 B1 | 6/2015 |
| KR | 10-2017-0097551 A | 8/2017 |

* cited by examiner

METHOD OF MANUFACTURING CAPACITOR COMPONENT

CROSS-REFERENCE TO RELATED APPLICATION(S)

This application claims benefit of priority to Korean Patent Application No. 10-2018-0142585 filed on Nov. 19, 2018 in the Korean Intellectual Property Office, the disclosure of which is incorporated herein by reference in its entirety.

TECHNICAL FIELD

The present disclosure relates to a capacitor component and a method of manufacturing the same.

BACKGROUND

A multilayer ceramic capacitor (MLCC) is a chip-type condenser mounted on the printed circuit boards of a variety of electronic products such as an image display device, including liquid crystal displays (LCD) and plasma display panels (PDP), computers, smartphones, cellular phones, and the like, serving to charge and discharge electricity.

A multilayer ceramic capacitor may be used as a component of various electronic devices as it is relatively small in size and is able to secure high capacity while being easily installed. As electronic devices such as computers, mobile devices, and the like, are miniaturized and increased in power, there has been increased demand for miniaturized and high capacity multilayer ceramic capacitors.

During a process of manufacturing a multilayer ceramic capacitor, a chipping defect in which edges of chips are damaged due to collisions between chips may occur, and the chipping defect may cause defects to exteriors of chips and a degradation of moisture resistance reliability.

Also, when chips have angled edges, a thickness of an external electrode is significantly low at the edges, which may further degrade moisture resistance reliability.

Generally, to prevent the chipping defects and to secure a certain thickness or greater of an external electrode at the edges, a method of grinding the edges to be rounded has been used.

However, in the case of configuring a thickness of a dielectric layer to be thin to reduce a size of a multilayer ceramic capacitor and to implement high capacitance, it may be difficult to select grinding conditions, chips may be broken during a grinding process, and degradation of properties caused by contactability, defects in exteriors of chips, degradation of moisture resistance reliability, and the like, may occur.

Thus, when a thickness of a dielectric layer is significantly low, it may be necessary to develop a method which can replace the general grinding method applied to a multilayer ceramic capacitor.

SUMMARY

An aspect of the present disclosure is to provide a capacitor component having improved reliability and a method of manufacturing the same.

According to an aspect of the present disclosure, a method of manufacturing a capacitor component includes preparing a laminate structure in which a plurality of ceramic sheets, each having an internal electrode pattern formed thereon, are layered, attaching an auxiliary member to an upper surface and a lower surface of the laminate structure, and disposing the laminate structure having the auxiliary member attached thereto to a lower mold on which jigs for blocking a length direction portion and a width direction portion of the laminate structure are disposed and compressing the laminate structure. The ceramic sheet has a thickness of 0.6 μm or less, and the auxiliary member has higher elasticity than elasticity of the lower mold.

According to another aspect of the present disclosure, a capacitor component includes a body comprising a dielectric layer having a thickness of 0.4 μm or less, and first and second internal electrodes opposing each other in a first direction with the dielectric layer interposed therebetween, and having first and second surfaces opposing each other in the first direction, third and fourth surfaces connected to the first and second surfaces and opposing each other in a second direction, fifth and sixth surfaces connected to the first to fourth surfaces and opposing each other, a first external electrode comprising a first connection portion disposed on the third surface of the body and connected to the first internal electrode, and a first band portion extending from the first connection portion to portions of the first and second surfaces, and a second external electrode comprising a second connection portion disposed on the fourth surface of the body and connected to the second internal electrode, and a second band portion extending from the second connection portion to portions of the first and second surfaces. In the first and second direction cross-section, edges of the body have a rounded shape. $1.005<BC/AB<1.2$ is satisfied, in which AB is defined as a distance between A and B, BC is defined as a distance between B and C, A is defined as a point at which an extension line of the third surface meets an extension line of the second surface, B is defined as an end of the first band portion disposed on the second surface, C is defined as a point at which the extension line of the third surface starts being spaced apart from the body, and A, B, and C are on a plane of the first and second direction cross-section.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

In the drawings, certain elements may be omitted to clearly describe the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, a T direction, or a thickness direction.

In the description below, a method of manufacturing a capacitor component according to an exemplary embodiment will be described, and a capacitor component according to an exemplary embodiment will be described according to another exemplary embodiment.

Method of Manufacturing Capacitor Component

Figure 1:
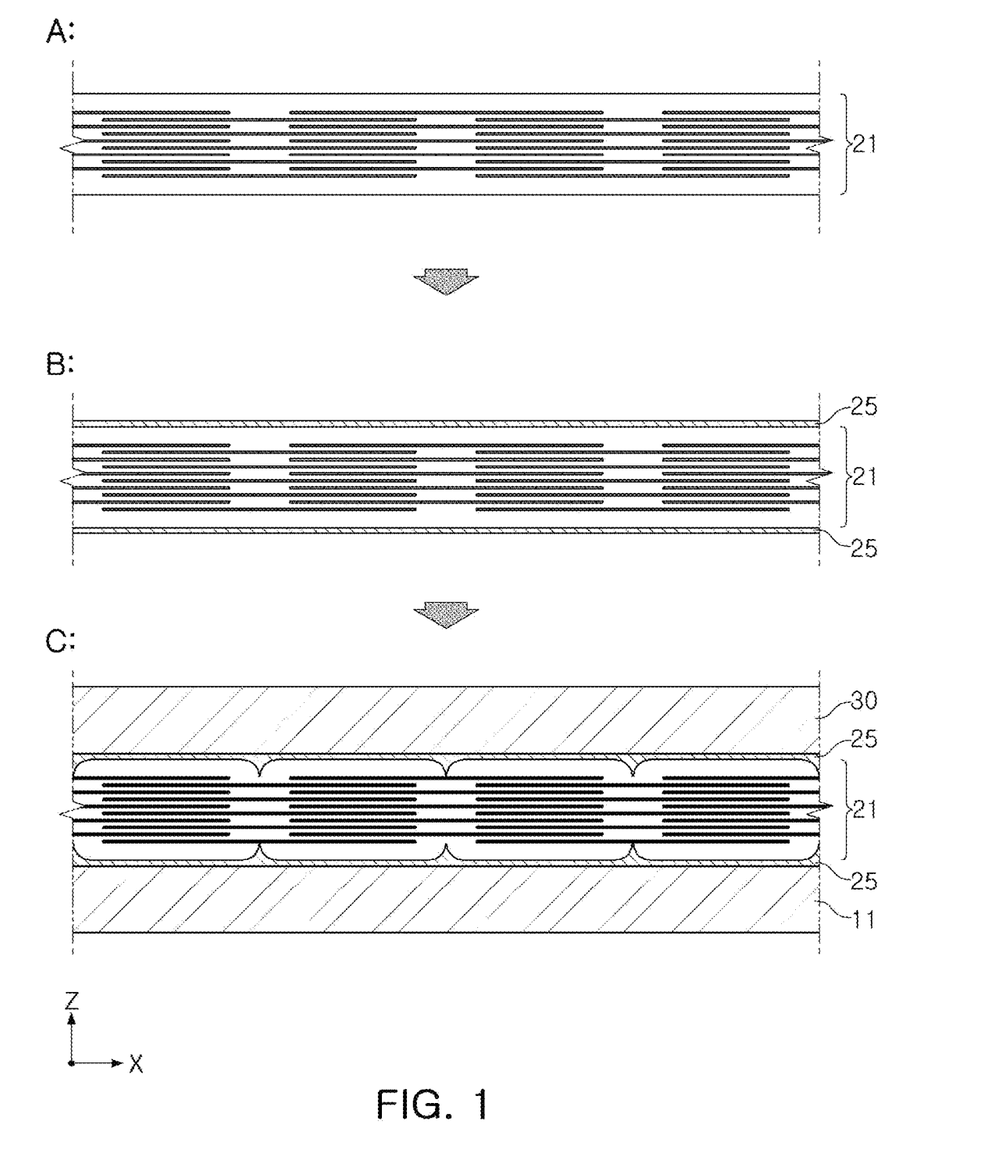
FIG. 1 is a diagram illustrating processes of a method of manufacturing a capacitor component according to an exemplary embodiment in the present disclosure.

FIG. 1 is a diagram illustrating processes of a method of manufacturing a capacitor component according to an exemplary embodiment.

Referring to FIG. 1, a method of manufacturing a capacitor component according to the exemplary embodiment may include preparing a laminate structure 21 in which a plurality of ceramic sheets, each having an internal electrode pattern formed thereon, are layered (step A); attaching an auxiliary member 25 (shown in FIG. 2) to an upper surface and a lower surface of the laminate structure 21 (step B); and disposing the laminate structure 21 having the auxiliary member 25 attached thereto on a lower mold 11 (shown in FIG. 2) on which jigs 12a and 12b for blocking a length direction (X direction) portion and a width direction (Y direction) portion of the laminate structure 21 are disposed, and compressing the laminate structure 21 by a upper mold 30. The ceramic sheet may have a thickness of 0.6 μm or less, and the auxiliary member 25 may have higher elasticity than elasticity of the lower mold 11.

During a process of manufacturing a multilayer ceramic capacitor, a chipping defect in which edges of chips are damaged due to collision between chips may occur, and the chipping defect may cause defects in exteriors of chips and degradation of moisture resistance reliability.

Also, when chips have angled edges, a thickness of an external electrode is significantly low at the edges, which may further degrade moisture resistance reliability.

Generally, to prevent the chipping defects and to secure a certain thickness of an external electrode at the edges, a method of grinding the edges to be rounded has been used.

However, in the case of configuring a thickness of a dielectric layers to be thin to reduce a size of a multilayer ceramic capacitor and to implement high capacitance, it may be difficult to select grinding conditions, chips may be broken during a grinding process, and degradation of properties caused by contactability, defects in exteriors, degradation of moisture resistance reliability, and the like, may occur.

In the exemplary embodiment, a length direction (X direction) portion and a width direction (Y direction) portion of the laminate structure 21 may be blocked by jigs, and an auxiliary member may be disposed on upper and lower portions of the laminate structure 21, thereby implementing rounded edges of a body without a separate grinding process. Accordingly, a thickness of an external electrode at the edges may improve, thereby improving moisture resistance reliability of a capacitor component.

Preparing Laminate Structure (Step A)

The laminate structure 21 in which a plurality of ceramic sheets are layered may be prepared, the plurality of ceramic sheets each having an internal electrode pattern formed thereon.

The ceramic sheet on which an internal electrode pattern is formed may be manufactured by a well-known method in the respective field. For example, the ceramic sheet on which an internal electrode pattern is formed may be manufactured by forming a green sheet by applying a ceramic slurry on a carrier film and performing a drying process, forming an internal electrode by printing a conductive paste on a surface of the ceramic green sheet, and separating the carrier film, or other methods.

Using the above described method, the ceramic laminate structure may be manufactured by a method of layering a desired number of the ceramic sheets, each of which has an internal electrode pattern formed thereon.

The ceramic sheet may have a thickness of 0.6 μm or less.

When a thickness of the ceramic sheet is greater than 0.6 μm, a general method of grinding edges of a body to be rounded may be used, and when a thickness of the ceramic sheet is greater than 0.6 μm, it may be difficult to secure a thickness of a dielectric layer to be 0.4 μm or less in a final product, and it may be difficult to reduce a size of a capacitor component while implementing high capacitance.

A thickness of the internal electrode pattern may be 0.5 μm or less.

When a thickness of the internal electrode pattern is greater than 0.5 μm, it may be difficult to secure a thickness of the internal electrode 0.4 μm or less in a final product, and it may be difficult to reduce a size of a capacitor component while implementing high capacitance.

Attaching Auxiliary Member (Step B)

The auxiliary member 25 may be attached to upper and lower portions of the laminate structure 21.

The auxiliary member 25 may fix the laminate structure 21 during a compressing process, and may be related to forming rounded edges of the body.

The auxiliary member 25 may also reduce a difference in densities between a portion in which overall internal electrodes overlap one another and a portion in which overall internal electrodes do not overlap one another, such that the auxiliary member 25 may prevent structural defects such as cracks or delamination.

The auxiliary member 25 may have higher elasticity than elasticity of the lower mole 11. When elasticity of the auxiliary member 25 is lower than elasticity of the lower mold 11, the above described effect may not be sufficiently obtained.

The auxiliary member 25 may also include a polymer film and an adhesive layer coating a surface of the polymer film.

The adhesive layer may be formed of adhesive resins having adhesion force to bond together the laminate structure and the adhesive tape. The adhesive layer may be, for example, an acrylic resin, an epoxy resin, or a mixture thereof, and more preferably, the adhesive layer may be formed of an adhesive resin having dispersed particle cells.

The particle cells may endow the adhesive resin with clamping force. The particle cells may be, for example, formed of a thermoplastic resin such as polyvinylidene chloride, and the like.

In the case of the adhesive resin having dispersed particle cells, a content of the adhesive resin may be 70 to 95 weight %, and a content of the particle cells may be 5 to 30 weight %. When a content of the particle cells is less than 5%, clamping force may be insignificant, and when a content of the particle cells is greater than 30%, adhesion force may degrade.

Also, the auxiliary member 25 may be a silicone rubber, a urethane rubber, or a natural rubber.

Compressing (Step C)

Figure 2:
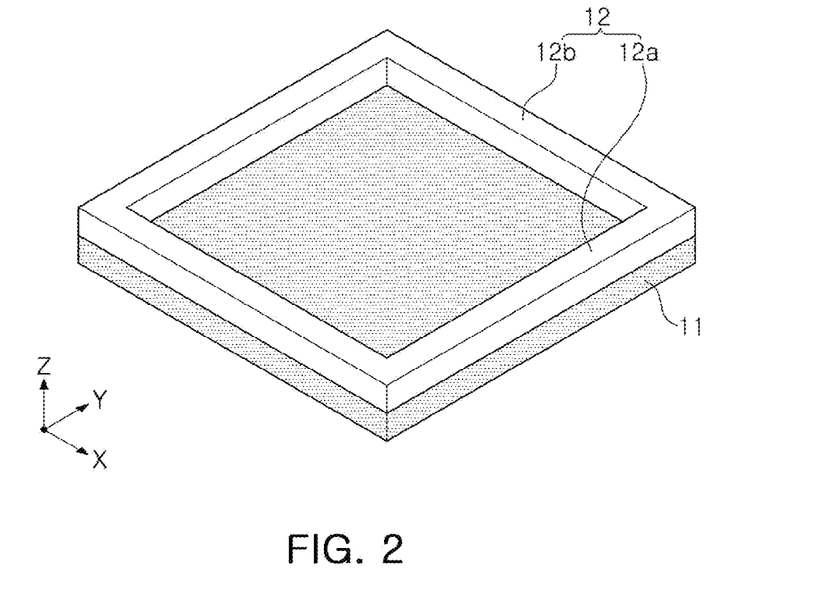
FIG. 2 is a schematic perspective diagram illustrating a lower mold and jigs used in a method of manufacturing a capacitor component according to an exemplary embodiment in the present disclosure.
Figure 3:
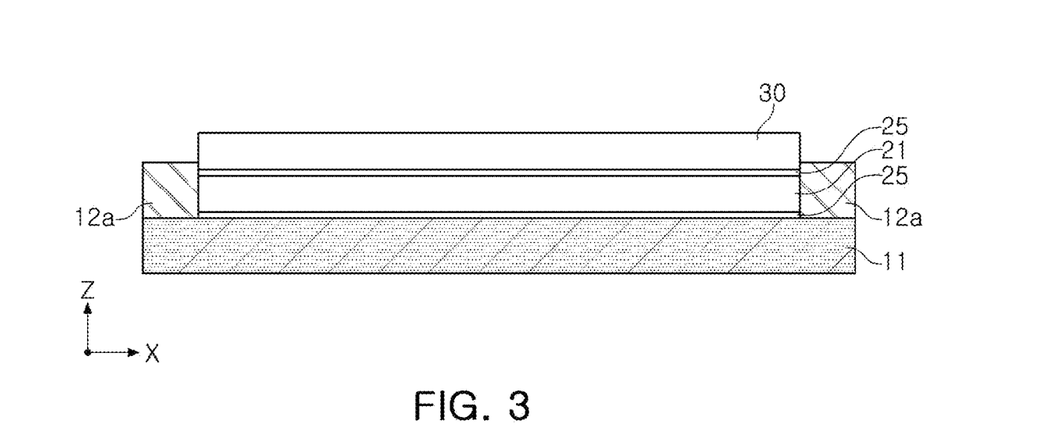
FIG. 3 is a schematic cross-sectional diagram illustrating a compressing process of a method of manufacturing a capacitor according to an exemplary embodiment in the present disclosure.

The laminate structure 21 having the auxiliary member 25 attached thereto may be disposed in the lower mold 11 in which jigs 12a and 12b for blocking a length direction (X direction) portion and a width direction (Y direction) portion of the laminate structure 21 are disposed, and the laminate structure 21 may be compressed.

FIG. 2 is a schematic perspective diagram illustrating a lower mold and jigs used in a method of manufacturing a capacitor component according to an exemplary embodiment.

FIG. 3 is a schematic cross-sectional diagram illustrating a compressing process of a method of manufacturing a capacitor according to an exemplary embodiment.

Referring to FIGS. 2 and 3, a compressing process may be undertaken while jigs 12a and 12b block a length direction (X direction) portion and a width direction (Y direction) portion of a laminate structure 21, thereby compressing the laminate structure 21 without deformation.

Also, as the compressing process is undertaken while an auxiliary member 25 is attached to upper and lower surfaces of the laminate structure 21, as illustrated in FIG. 1, the auxiliary member 25 may be followed into a portion in which density of an internal electrode pattern is relatively low.

Accordingly, a recessed structure may be formed in a portion in which density of an internal electrode pattern is relatively low. Thus, edges of the body may have rounded shapes without a separate grinding process, and a thickness of an external electrode at the edge portions may be improved, thereby improving moisture resistance reliability of a capacitor component.

In addition, density of a portion in which density of an internal electrode pattern is relatively low may also be improved, thereby further improving moisture resistance reliability.

After the compressing process, a process for removing the auxiliary member, a cutting process, a sintering process, a process of forming an external electrode, a plating process, and the like, may be subsequently undertaken to manufacture a capacitor component. The subsequent processes may be performed using well-known methods in the respective field.

Comparative Example

Figure 4:
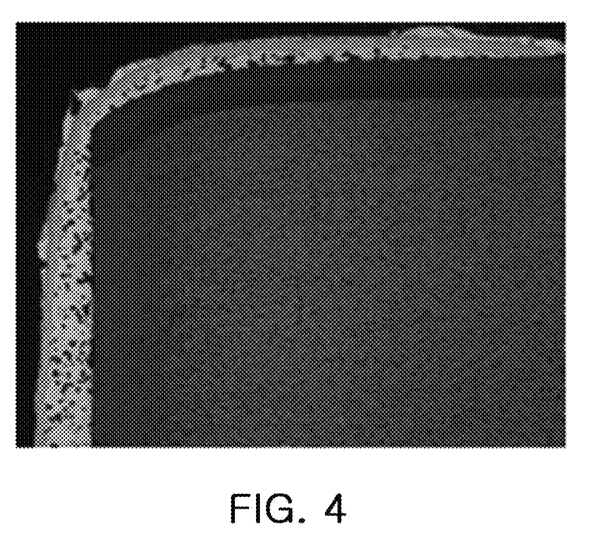
FIG. 4 is an image of a cross-section of a capacitor component taken in thickness and length directions according to an exemplary embodiment in the present disclosure.

FIG. 4 is an image of a cross-section of a capacitor component (embodiment) taken in thickness and length directions according to an exemplary embodiment.

Figure 5:
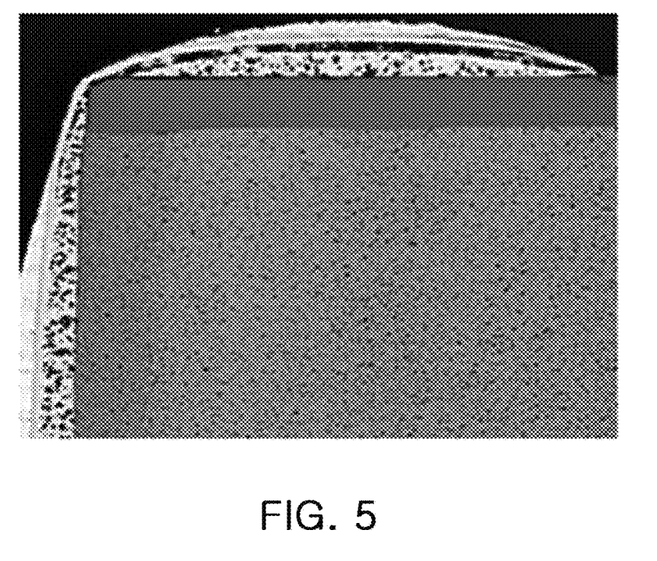
FIG. 5 is an image of a cross-section taken in thickness and length directions of a comparative example.

FIG. 5 is an image of a cross-section of a comparative example taken in thickness and length directions.

In the embodiment, processes of attaching an auxiliary member to upper and lower surfaces of a laminate structure, disposing jigs for blocking a length direction portion and a width direction portion of the laminate structure on a lower mold, and compressing the laminate structure were undertaken.

In the comparative example, the auxiliary member was not attached to the upper and lower surfaces of the laminate structure, the jigs were not disposed on the lower mold, and the compressing process was undertaken in absence of the auxiliary member and the jigs.

In both of the embodiment and the comparative example, a thickness of a ceramic sheet was 0.55 μm, and a separate grinding process was not undertaken in both of the embodiment and the comparative example.

Referring to FIGS. 4 and 5, in the embodiment, an edge portion was recessed and had a rounded shape, whereas, in the comparative example, an edge portion had an angled shape.

Also, 50 samples were prepared in the embodiment and in the comparative example each, and moisture resistance reliability was examined.

In the examination of moisture resistance reliability, a reference voltage was applied for 12 hours under relative humidity of 85%, and the samples in which insulation resistance value degrades by 1.0E+1 or higher as compared to an initial value were determined as defects.

TABLE 1

|  | Number of Defects | Defect Rate |
| --- | --- | --- |
| Embodiment | 1/50 | 2% |
| Comparative Example | 12/50 | 24% |

In the embodiment, one sample out of 50 samples was determined as being defective, and in the comparative example, 12 samples out of 50 samples were determined as being defective.

Thus, the embodiment had improved moisture resistance reliability as compared to the comparative example.

Capacitor Component

Figure 6:
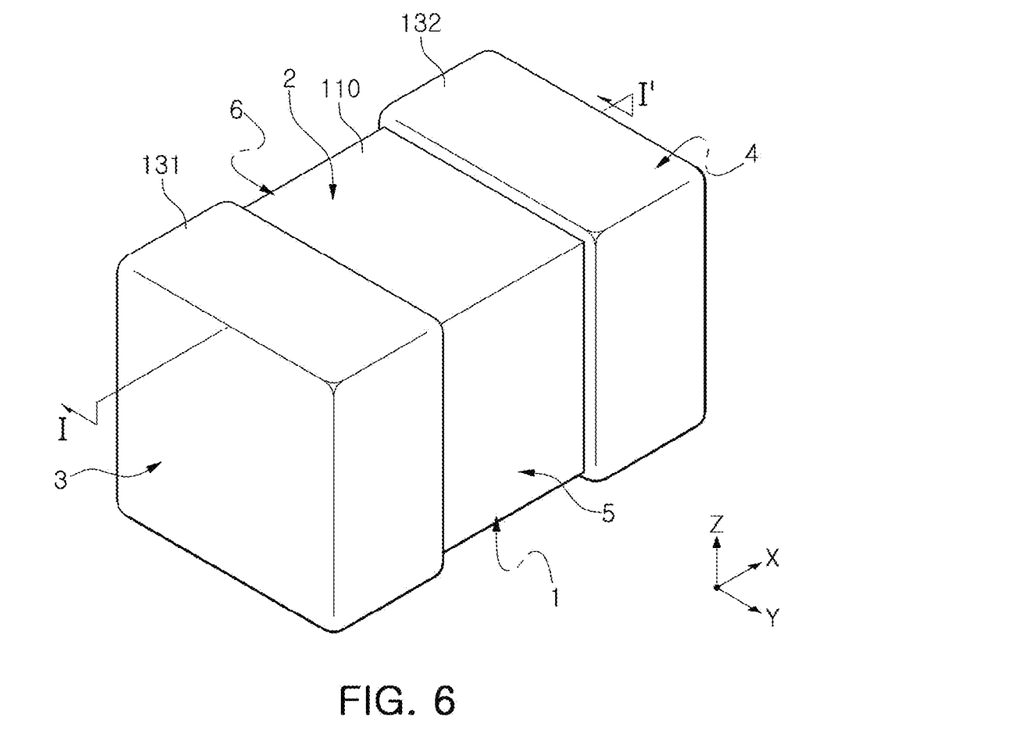
FIG. 6 is a schematic diagram illustrating a capacitor component according to another exemplary embodiment in the present disclosure.

FIG. 6 is a schematic diagram illustrating a capacitor component according to another exemplary embodiment.

Figure 7:
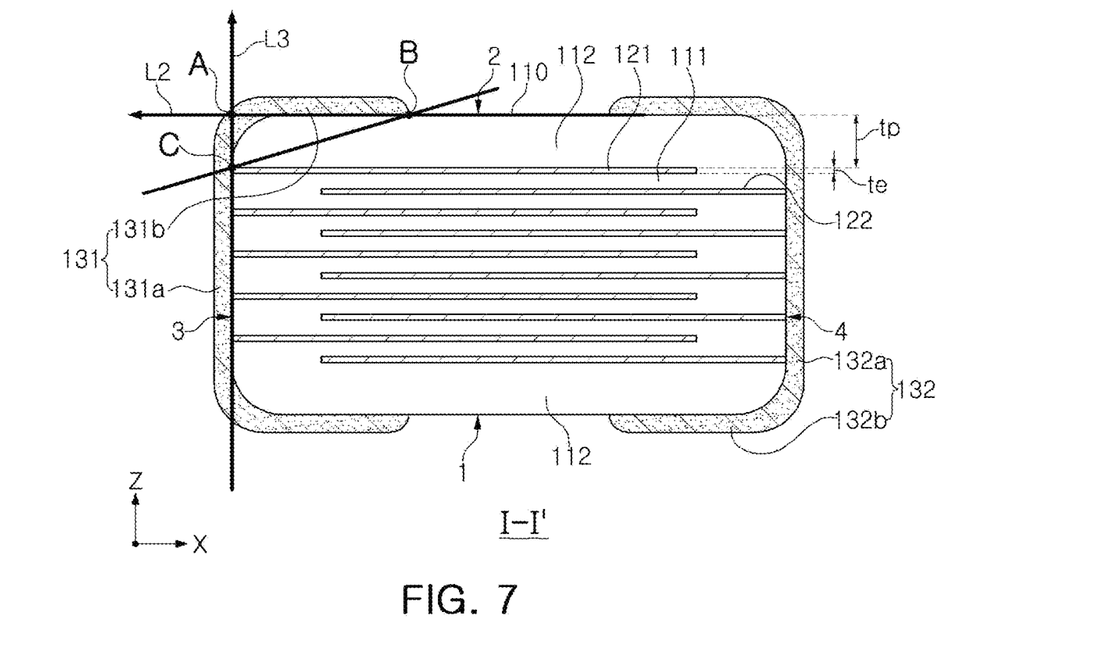
FIG. 7 is a schematic cross-sectional diagram taken along line I-I' in FIG. 6.

FIG. 7 is a schematic cross-sectional diagram taken along line I-I' in FIG. 6.

In the description below, a capacitor component according to another exemplary embodiment will be described in greater detail with reference to FIGS. 6 and 7.

The capacitor component according to the exemplary embodiment may be manufactured by the method of manufacturing a capacitor component described above.

A capacitor component 100 according to the exemplary embodiment may include a body 110 comprising a dielectric layer 111 having a thickness of 0.4 μm or less, and first and second internal electrodes 121 and 122 opposing each other in a first direction (Z direction) with the dielectric layer interposed therebetween, and having first and second surfaces 1 and 2 opposing each other in the first direction, third and fourth surfaces 3 and 4 connected to the first and second surfaces and opposing each other in a second direction (X direction), fifth and sixth surfaces 5 and 6 connected to the first to fourth surfaces and opposing each other in a third direction (Y direction); a first external electrode 131 comprising a first connection portion 131a disposed on the third surface 3 of the body 110 and connected to the first internal electrode 121, and a first band portion 131b extending from the first connection portion 131a to portions of the first and second surfaces 1 and 2; and a second external electrode 132 comprising a second connection portion 132a disposed on the fourth surface 4 of the body 110 and connected to the second internal electrode 122, and a second band portion 132b extending from the second connection portion 132a to portions of the first and second surfaces 1 and 2. In the first and second direction cross-section (an L-T cross-section), edges of the body may have a rounded shape, and when a point at which an extension line L3 of the third surface 3 meets an extension line L2 of the second surface 2 is defined as A, an end of the first band portion disposed on the second surface 2 is defined as B, and a point at which the extension line of the third surface 3 starts being spaced apart from the body is defined as C, a distance between A and B is defined as AB, and a distance between B and C is defined as BC, A, B, and C may be on a plane of the first and second direction cross-section (an L-T cross-section) and may satisfy $1.005 < BC/AB < 1.2$.

In the body 110, the dielectric layer 111 and the internal electrodes 121 and 122 may be alternately layered.

A shape of the body 110 may not be limited to any particular shape, but as illustrated in the diagram, the body 110 may have a hexahedral shape or a shape similar to a hexahedron. Due to contraction of a ceramic powder included in the body 110 during a sintering process, the body 110 may have substantially a hexahedral shape although the hexahedral shape may not be an exact hexahedron formed by straight lines.

The body 110 may have first and second surfaces 1 and 2 opposing each other in a thickness direction (Z direction), third and fourth surfaces 3 and 4 connected to the first and second surfaces 1 and 2 and opposing each other in a length direction (X direction), and fifth and sixth surfaces 5 and 6 connected to the first and second surfaces 1 and 2 and the third and fourth surfaces 3 and 4 and opposing each other in a width direction (Y direction).

The plurality of dielectric layers 111 forming the body 110 may be in a sintered state, and the dielectric layers 111 may be integrated such that boundaries between adjacent dielectric layers 111 may be difficult to identify without using a scanning electron microscope (SEM).

A material of the dielectric layer 111 may not be limited to any particular material as long as sufficient capacitance can be obtained. For example, a material of the dielectric layer 111 may be a barium titanate ($BaTiO_3$) powder.

As the material of the dielectric layer 111, various ceramic additives, organic solvents, coupling agents, dispersing agents, and the like, may be added to a barium titanate (BaTiO3) powder, or the like, depending on an intended purpose.

In this case, a thickness of the dielectric layer 111 may be 0.4 μm or less.

Generally, to prevent chipping defects and to secure a certain thickness or greater of an external electrode at edges portions, a method of grinding the edges of a body to be rounded has been used. However, in the case of configuring a thickness of a dielectric layer to be thin to reduce a size of a multilayer ceramic capacitor and to implement high capacitance, it may be difficult to select grinding conditions, chips may be broken during a grinding process, and degradation of properties caused by contactability, defects in exteriors of chips, degradation of moisture resistance reliability, and the like, may occur.

As described in the exemplary embodiment above, by blocking a length direction (X direction) portion and a width direction (Y direction) portion of the laminate structure 21 using jigs and disposing the auxiliary member in upper and lower portions of the laminate structure 21, edges of the body may have a rounded shape without a separate grinding process, and a thickness of an external electrode at the edge portions may be improved, thereby improving moisture resistance reliability.

Thus, according to the exemplary embodiment, when a thickness of the dielectric layer 111 is 0.4 μm or less, moisture resistance reliability may further improve.

A thickness of the dielectric layer 111 may refer to an average thickness of the dielectric layers 111 disposed between the first and second internal electrodes 121 and 122.

The average thickness of the dielectric layer 111 may be measured by scanning a cross-section of the body 110 taken in length and thickness directions using a scanning electron microscope (SEM).

For example, a random image of the dielectric layer 111 may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points spaced apart from each other by equal intervals may be measured in a capacitance forming portion which refer to an area of overlap between the first and second internal electrodes 121 and 122.

In this case, the capacitor component 100 may include a capacitance forming portion disposed in the body 110 and forming capacitance including the first internal electrode 121 and the second internal electrode 122 disposed to oppose each other with the dielectric layer 111 interposed therebetween, and a cover portion 112 disposed on upper and lower portions of the capacitance forming portion.

The cover portion 112 may not include the internal electrodes, and may include the same material as the material of the dielectric layer 111. In other words, the cover portion 112 may include a ceramic material, such as a barium titanate ($BaTiO_3$) ceramic material, for example.

The cover portion 112 may be formed by disposing a single dielectric layer or layering two or more dielectric layers on upper and lower surfaces of the capacitance forming portion, respectively, and may prevent damage to an internal electrode caused by physical or chemical stress.

A thickness of the cover portion 112 may not be limited to any particular size, but to reduce a size of a capacitor component and to implement high capacitance, a thickness tp of the cover portion 112 may be 20 μm or less. In this case, however, it may be difficult to apply the method of grinding edges of a body to have a rounded shape, and a moisture penetration route may be reduced, which may cause degradation of moisture resistance reliability.

Thus, the effect of improvement in moisture resistance reliability according to the exemplary embodiment may be more prominent when a thickness of the cover portion 112 is 20 μm or less.

The internal electrodes 121 and 122 may oppose each other with the dielectric layer 111 interposed therebetween.

The internal electrodes 121 and 122 may include the first and second internal electrodes 121 and 122 alternately disposed with the dielectric layer 111 interposed therebetween.

The internal electrodes 121 and 122 may be exposed to the third and fourth surfaces 3 and 4 of the body 110.

Referring to FIG. 7, the first internal electrode 121 may be spaced apart from the fourth surface 4 and may be exposed through the third surface 3. The second internal electrode 122 may be spaced apart from the third surface 3 and may be exposed through the fourth surface 4. The first external electrode 131 may be disposed on the third surface 3 and connected to the first internal electrode 121, and the second external electrode 132 may be disposed on the fourth surface 4 and connected to the second internal electrode 122.

The first and second internal electrodes 121 and 122 may be electrically isolated from each other by the dielectric layer 111 interposed therebetween. The body 110 may be formed by layering a ceramic green sheet on which the first internal electrode 121 is printed, and a ceramic green sheet on which the second internal electrode 122 is printed in a thickness direction (Z direction), and performing the above-described compressing process and a sintering process.

As the method of printing a conductive paste, a screen printing method, a gravure printing method, or the like, may be used, but the method of printing is not limited thereto.

A thickness of each of the first and second internal electrodes 121 and 122 may not be limited to any particular size, but to reduce a size of a capacitor component and to implement high capacitance, a thickness to of the first and second internal electrodes 121 and 122 may be 0.4 μm or less.

A thickness of each of the first and second internal electrodes 121 and 122 may refer to an average thickness of the first and second internal electrodes 121 and 122.

The average thickness of the first and second internal electrodes 121 and 122 may be measured by scanning a cross-section of the body 110 taken in length and thickness directions using a scanning electron microscope (SEM).

For example, a random image of the first and second internal electrodes 121 and 122 may be extracted from a scanned image of a cross-section taken in length and thickness directions (an L-T direction), created by cutting a central portion of the body 110 in a width direction, using an SEM, and an average of thicknesses of 30 points at equal intervals, measured in a length direction, may be calculated.

The 30 points spaced apart from each other by equal intervals may be measured in a capacitance forming portion which refer to an area of overlap between the first and second internal electrodes 121 and 122.

The external electrodes 131 and 132 may be disposed outwardly of the body 110, and may be connected to the internal electrodes 121 and 122. As illustrated in FIG. 7, the external electrodes 131 and 132 may include first and second external electrodes 131 and 132 respectively connected to the first and second internal electrodes 121 and 122.

The first and second external electrodes 131 and 132 may be electrically connected to the first and second internal electrodes 121 and 122 to form capacitance, respectively, and the second external electrode 132 may be connected to a potential different from a potential to which the first external electrode 131 is connected.

The first external electrode 131 may include a first connection portion 131a disposed on the third surface of the body and connected to the first internal electrode, and a first band portion 131b extending from the first connection portion to portions of the first and second surfaces.

The second external electrode 132 may include a second connection portion 132a disposed on the fourth surface of the body and connected to the second internal electrode, and a second band portion 132b extending from the second connection portion to portions of the first and second surfaces.

Referring to FIG. 7, the capacitor component according to the exemplary embodiment may be configured such that, in a cross-section (L-T cross-section) taken in a first-second direction, edges of the body may have a rounded shape, and when a point at which an extension line L3 of the third surface meets an extension line L2 of the second surface is defined as A, an end of the first band portion 131b disposed on the second surface is defined as B, a point at which the extension line of the third surface starts being spaced apart from the body is defined as C, a distance between A and B is defined as AB, and a distance between B and C is defined as BC, A, B, and C may satisfy $1.005<BC/AB<1.2$.

When BC/AB is less than 1.005, a thickness of the external electrode at the edge portions may decrease due to reduction in the amount of external electrodes applied to the edge portions, which may cause degradation of moisture resistance reliability, whereas, when BC/AB is greater than 1.2, a distance between the first and second internal electrodes may be reduced at an end portion at which the first and second internal electrodes overlap each other, which may cause degradation of withstand voltage properties and an increase of an occurrence rate of shorts.

The configuration to satisfy $1.005<BC/AB<1.2$ may be secured by applying the manufacturing method in the exemplary embodiment described above without performing a process of grinding the edges of the body.

Referring back to FIGS. 4 and 5, in the embodiment in FIG. 4, BC/AB was 1.034, and in the comparative example in FIG. 5, BC/AB had a value close to one.

The first and second external electrodes 131 and 132 may include an electrode layer, and a plating layer disposed on the electrode layer.

The electrode layer may mechanically connect the body 110 to the external electrodes 131 and 132, and may mechanically and electrically connect the internal electrodes 121 and 122 to the external electrodes 131 and 132.

The electrode layer may be formed of any material having electrical conductivity such as a metal, and a specific material of the electrode layer may be determined in consideration of electrical properties, structural stability, and the like.

For example, the electrode layer may include one or more conductive metals selected from a group comprised of copper (Cu), lead (Pb), and silver (Ag), and glass.

The plating layer may improve mechanical, electrical, and chemical stability and mounting properties.

The plating layer may include a first plating layer for securing mechanical, electrical, and chemical stability, and a second plating layer disposed on the first plating layer and for improving mounting properties.

The first plating layer may include one or more materials selected from a group comprised of nickel (Ni), copper (Cu), lead (Pb), and silver (Ag). The first plating layer may be, for example, an Ni plated layer.

A size of the capacitor component 100 may not be limited to any particular size.

However, to reduce a size of a multilayer ceramic capacitor while implementing high capacitance, a thickness of the dielectric layer and a thickness of the internal electrode may be need to be significantly reduced to increase the number of layers. Thus, the effect of improvement in moisture resistance reliability according to the exemplary embodiment may be more prominent in a capacitor component having a size 0402(0.4 mm×0.2 mm) or less.

Thus, a distance between the third surface 3 and the fourth surface 4 may be 0.4 mm or less, and a distance between the fifth surface 5 and the sixth surface 6 may be 0.2 mm or less.

According to the aforementioned exemplary embodiments, by controlling a compressing process, rounded edges of the body may be implemented without a separate grinding process, and a thickness of an external electrode at the edge portions may increase, thereby improving moisture resistance reliability of a capacitor component.

While the exemplary embodiments have been shown and described above, it will be apparent to those skilled in the art that modifications and variations could be made without departing from the scope of the present invention as defined by the appended claims.

What is claimed is:

1. A method of manufacturing capacitor components, comprising:
    forming a laminate structure in which a plurality of ceramic sheets, each having an internal electrode pattern formed thereon, are layered;
    attaching an auxiliary member to an upper surface and a lower surface of the laminate structure;
    disposing the laminate structure having the auxiliary member attached thereto on a lower mold on which jigs for blocking a length direction portion and a width direction portion of the laminate structure are disposed, and then compressing the laminate structure and the auxiliary member attached to the laminated structure;
    after compressing the laminate structure and the auxiliary member attached to the laminated structure, removing the auxiliary member and then cutting the laminate structure into a plurality of bodies; and
    after cutting the laminate structure, forming external electrodes on each of the plurality of bodies to form the capacitor components,
    wherein
    in one of the manufactured capacitor components: a body, among the plurality of bodies, of the one of the manufactured capacitor components has first and second surfaces opposing each other in a first direction of the body of the one of the manufactured capacitor components, third and fourth surfaces connected to the first and second surfaces and opposing each other in a second direction of the body of the one of the manufactured capacitor components, and fifth and sixth surfaces connected to the first to fourth surfaces and opposing each other, and
    in the manufactured capacitor component, 1.005<BC/AB<1.2 is satisfied, in which AB is defined as a distance between A and B, BC is defined as a distance between B and C, A is defined as a point at which an extension line of the third surface meets an extension line of the second surface, B is defined as an end of a first band portion of one of the external electrodes disposed on the second surface, C is defined as a point at which the extension line of the third surface starts being spaced apart from the body, and A, B, and C are on a plane of a first and second direction cross-section of the body of the one of the manufactured capacitor components.

2. The method of claim 1, wherein the auxiliary member has greater elasticity than elasticity of the lower mold.

3. The method of claim 1, wherein the auxiliary member comprises a polymer film and an adhesive layer coating a surface of the polymer film.

4. The method of claim 3, wherein the adhesive layer is comprised of an adhesive resin constituting 70% to 95% of the adhesive layer by weight and particle cells constituting 5% to 30% of the adhesive layer by weight.

5. The method of claim 1, wherein the auxiliary member is a silicone rubber, a urethane rubber, or a natural rubber.

6. The method of claim 1, wherein the internal electrode pattern has a thickness of 0.5 μm or less.

7. The method of claim 1, further comprising:
    after cutting the laminate structure into the plurality of bodies, sintering the plurality of bodies,
    wherein after sintering the plurality of bodies and before forming the external electrodes, no grinding process is performed to the plurality of bodies.

8. The method of claim 1, further comprising:
    after cutting the laminate structure into the plurality of bodies, sintering the plurality of bodies.

9. A method of manufacturing capacitor components, comprising:
    forming a laminate structure in which a plurality of ceramic sheets, each having an internal electrode pattern formed thereon, are layered;
    attaching an auxiliary member to an upper surface and a lower surface of the laminate structure;
    disposing the laminate structure having the auxiliary member attached thereto on a lower mold on which jigs for blocking a length direction portion and a width direction portion of the laminate structure are disposed, and compressing the laminate structure and the auxiliary member attached to the laminate structure;
    after compressing the laminate structure and the auxiliary member attached to the laminated structure, removing the auxiliary member and then cutting the laminate structure into a plurality of bodies;
    sintering the plurality of bodies; and
    forming external electrodes on each of the plurality of bodies,
    wherein after sintering the plurality of bodies and before forming the external electrodes, no grinding process is performed to the plurality of bodies,
    in one of the manufactured capacitor components: dielectric layers of the one of the capacitor components, made of the plurality of ceramic sheets, are stacked in a first direction of the body of the one of the capacitor components, the external electrodes of the one of capacitor components thereof oppose each other in a second direction of the body of the one of capacitor components, and in the first and second direction cross-section of the body of the one of the capacitor components, an edge of the body of the one of the capacitor components has a rounded shape without grinding; the body of the one of the manufactured capacitor components has first and second surfaces opposing each other in a first direction of the body of the one of the manufactured capacitor components, third and fourth surfaces connected to the first and second surfaces and opposing each other in a second direction of the body of the one of the manufactured capacitor components, and fifth and sixth surfaces connected to the first to fourth surfaces and opposing each other, and in the manufactured capacitor component, 1.005<BC/AB<1.2 is satisfied, in which AB is defined as a distance between A and B, BC is defined as a distance between B and C, A is defined as a point at which an extension line of the third surface meets an extension line of the second surface, B is defined as an end of a first band portion of one of the external electrodes disposed on the second surface, C is defined as a point at which the extension line of the third surface starts being spaced apart from the body, and A, B, and C are on a plane of a first and second direction cross-section of the body of the one of the manufactured capacitor components.

10. The method of claim 9, wherein the ceramic sheet has a thickness of 0.6 μm or less, and the auxiliary member has greater elasticity than elasticity of the lower mold.

11. The method of claim 9, wherein the auxiliary member comprises a polymer film and an adhesive layer coating a surface of the polymer film.

12. The method of claim 11, wherein the adhesive layer is comprised of an adhesive resin constituting 70% to 95% of the adhesive layer by weight and particle cells constituting 5% to 30% of the adhesive layer by weight.

13. The method of claim 9, wherein the auxiliary member is a silicone rubber, a urethane rubber, or a natural rubber.

14. The method of claim 9, wherein the internal electrode pattern has a thickness of 0.5 μm or less.

15. The method of claim 9, wherein the jigs are in direct contact with the laminate structure.

16. The method of claim 1, wherein one of the plurality of ceramic sheets has a thickness of 0.6 μm or less.

17. The method of claim 1, wherein the jigs are in direct contact with the laminate structure.

* * * * *